United States Patent
Hansen et al.

(10) Patent No.: US 12,041,878 B2
(45) Date of Patent: Jul. 23, 2024

(54) SUGARCANE HARVESTER EXTRACTOR WITH LEAF SHREDDER

(71) Applicant: DEERE & COMPANY, Moline, IL (US)

(72) Inventors: Matthew J. Hansen, Thibodaux, LA (US); Eric P. Richard, Thibodaux, LA (US); Dusk S. Mixon, Saint Amant, LA (US); Todd J. Rodrigue, Thibodaux, LA (US); Guy E. Burch, Thibodaux, LA (US); Brian J. Fields, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 435 days.

(21) Appl. No.: 17/243,640

(22) Filed: Apr. 29, 2021

(65) Prior Publication Data

US 2022/0346317 A1   Nov. 3, 2022

(51) Int. Cl.
*A01D 45/10* (2006.01)
*A01D 43/08* (2006.01)

(52) U.S. Cl.
CPC ............. *A01D 45/10* (2013.01); *A01D 43/08* (2013.01); *A01D 43/088* (2013.01)

(58) Field of Classification Search
CPC ....... A01D 43/08; A01D 43/088; A01D 45/10
See application file for complete search history.

(56) References Cited

U.S. PATENT DOCUMENTS

| 3,422,612 | A  | * | 1/1969 | Woodring | A01D 34/535 56/294 |
| 4,177,953 | A  | * | 12/1979 | Ribeiro Pinto | A01D 45/10 241/58 |
| 4,287,708 | A  | * | 9/1981 | Neely, Jr. | A01D 43/00 241/73 |
| 4,702,423 | A  | * | 10/1987 | Cerveira de Mello Ribeiro Pinto | A01D 45/10 241/222 |
| 6,869,356 | B2 | * | 3/2005 | Hinds | A01D 45/10 460/70 |
| 2015/0327438 | A1 | * | 11/2015 | Cazenave | A01D 45/10 56/51 |
| 2018/0139905 | A1 | * | 5/2018 | Monteguise | A01F 12/40 |
| 2019/0037770 | A1 | * | 2/2019 | Dugas | A01F 12/444 |

(Continued)

FOREIGN PATENT DOCUMENTS

BR   0300246 B1   7/2010
BR   1105749 B1   1/2018

(Continued)

OTHER PUBLICATIONS

Li, CN-215530088 (Year: 2022).*

(Continued)

*Primary Examiner* — Alicia Torres (57) ABSTRACT

An extractor for a sugarcane harvester that chops stalks of sugarcane into billets. The extractor comprises a fan, a leaf shredder, and a hub. The fan comprises fan blades to induce a flow of air to separate leaves from billets. The leaf shredder comprises shredding blades to cut leaves prior to their ejection from the extractor. The hub is rotatably driven about an axis of rotation. The fan blades and the cutting blades are coupled to the hub for rotation together with the hub about the axis of rotation.

13 Claims, 9 Drawing Sheets

(56) References Cited

U.S. PATENT DOCUMENTS

| | | | |
|---|---|---|---|
| 2020/0245558 A1* | 8/2020 | Oubre, Jr. | A01D 43/08 |
| 2023/0120208 A1* | 4/2023 | Hansen | A01D 45/10 |
| | | | 56/10.1 |
| 2023/0121162 A1* | 4/2023 | Hansen | A01F 12/40 |
| | | | 56/10.1 |

FOREIGN PATENT DOCUMENTS

| | | | |
|---|---|---|---|
| BR | 202019019565 U2 * | 2/2020 | ............ A01D 45/10 |
| BR | 202019019576 U2 | 2/2020 | |
| CN | 215530088 * | 1/2022 | |
| SU | 886806 A1 | 12/1981 | |
| WO | WO0032026 A1 | 6/2000 | |
| WO | WO-2016004490 A1 * | 1/2016 | ............ A01D 45/10 |

OTHER PUBLICATIONS

Jorge L.M. Neves et al., Sugarcane trash shredding, Sugar Industry 140 (2015) No. 3, pp. 156-160.

Jorge L.M. Neves et al., Trash shredder mounted on chopped sugarcane harvester model John Deere 3520, No. 11 (2016) Sugar Industry 141, pp. 713-719.

* cited by examiner

SUGARCANE HARVESTER EXTRACTOR WITH LEAF SHREDDER

FIELD OF THE DISCLOSURE

The present disclosure relates to extractors for sugarcane harvesters.

BACKGROUND OF THE DISCLOSURE

Sugarcane harvesters often have a chopper, an elevator, and one or more extractors. The chopper chops sugarcane stalks harvested by the sugarcane harvester into segments called billets. The elevator lifts the billets to a higher elevation for discharge into a wagon for transport to a mill. A primary extractor is located between the chopper and the elevator. In sugarcane harvesters that have a secondary extractor, the secondary extractor is mounted to the upper discharge end of the elevator. In each extractor, the extractor has a fan to induce a flow of air to separate leaves of the harvested sugarcane plants from the billets.

SUMMARY OF THE DISCLOSURE

According to an aspect of the present disclosure, there is disclosed an extractor for a sugarcane harvester that chops stalks of sugarcane into billets. The extractor comprises a fan, a leaf shredder, and a hub. The fan comprises fan blades to induce a flow of air to separate leaves from billets. The leaf shredder comprises shredding blades to cut leaves prior to their ejection from the extractor. The hub is rotatably driven about an axis of rotation. The fan blades and the cutting blades are coupled to the hub for rotation together with the hub about the axis of rotation.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
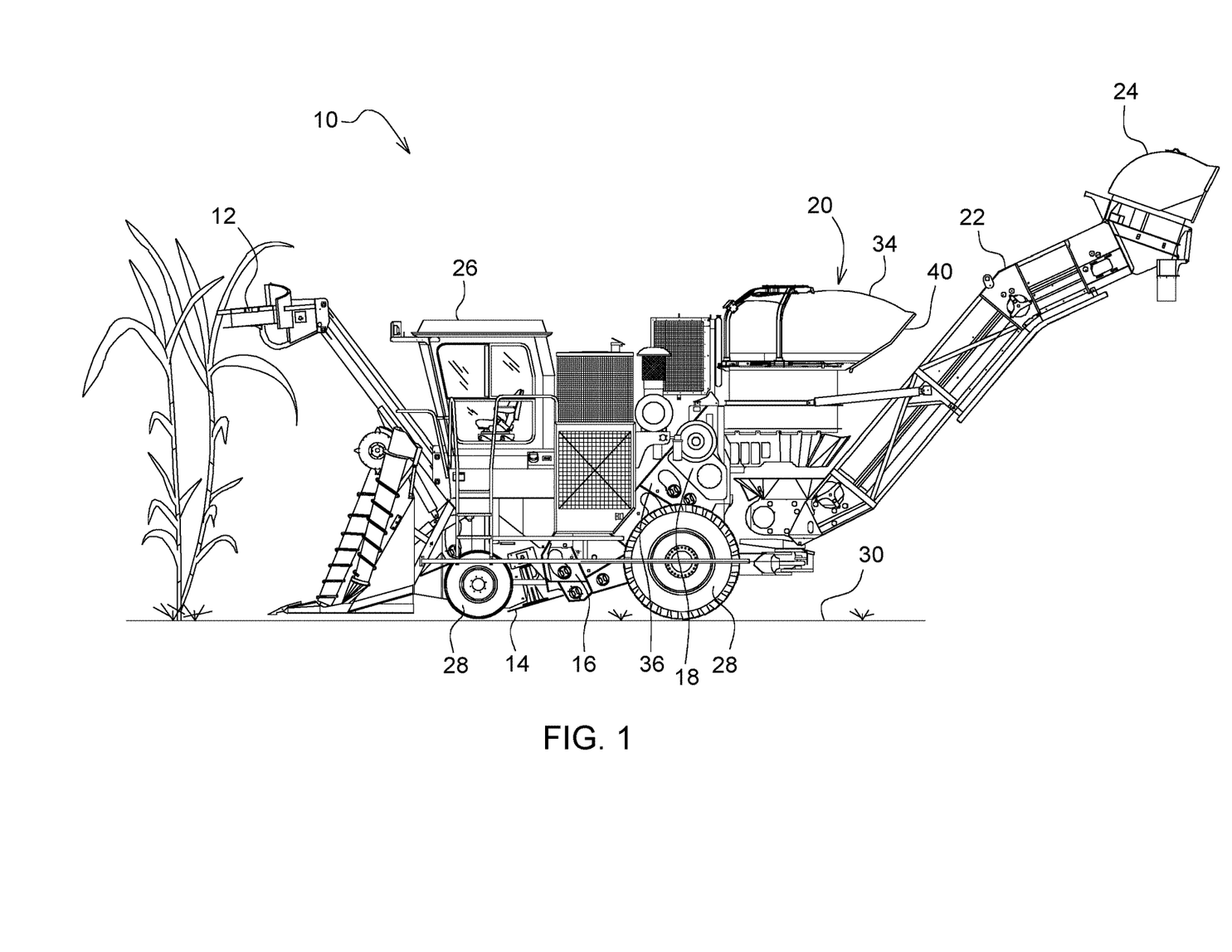
FIG. 1 is a side elevational view showing a sugarcane harvester with a primary extractor.
Figure 2:
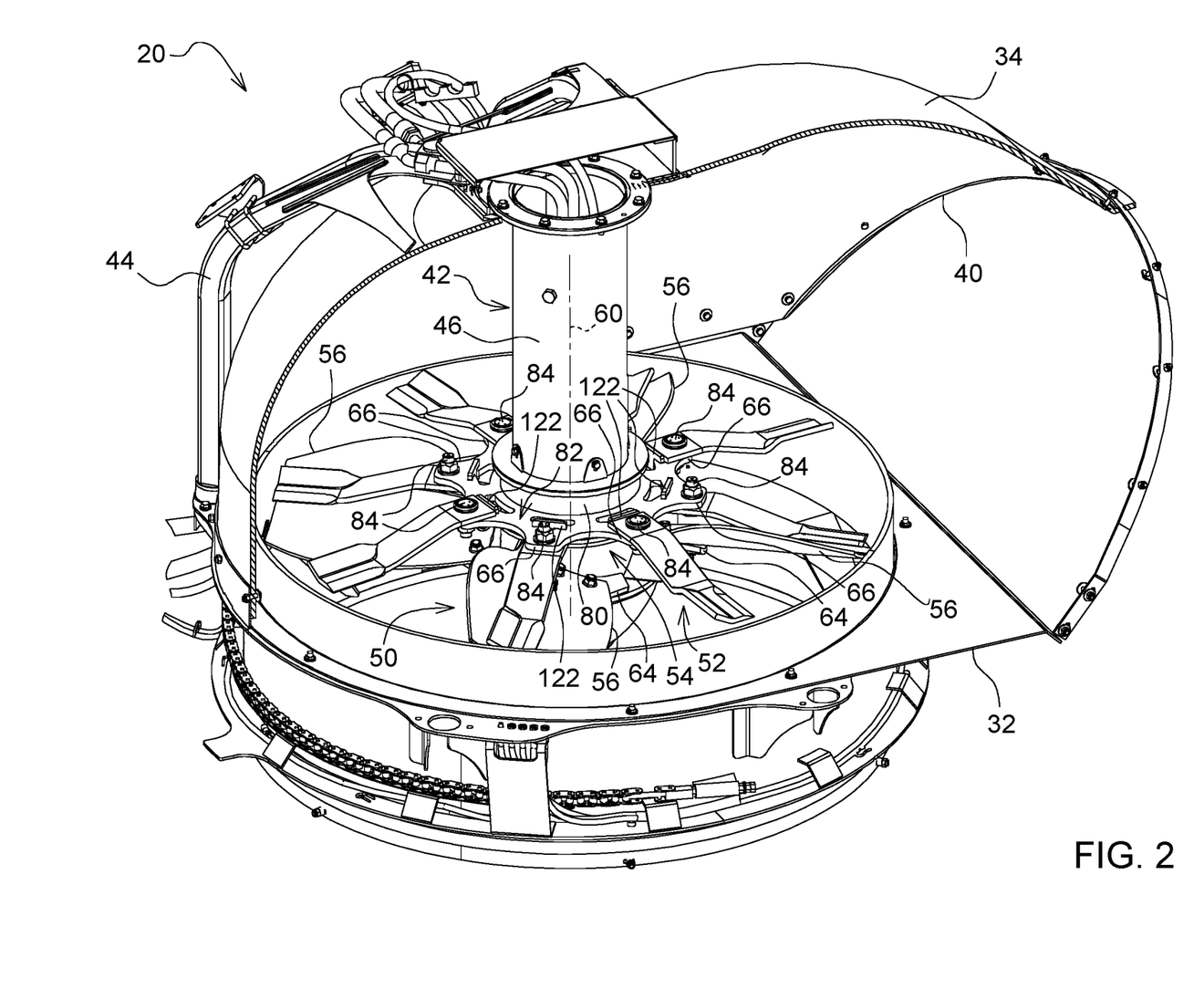
FIG. 2 is a perspective view, with portions broken away, showing the primary extractor with a fan and a leaf shredder.
Figure 3:
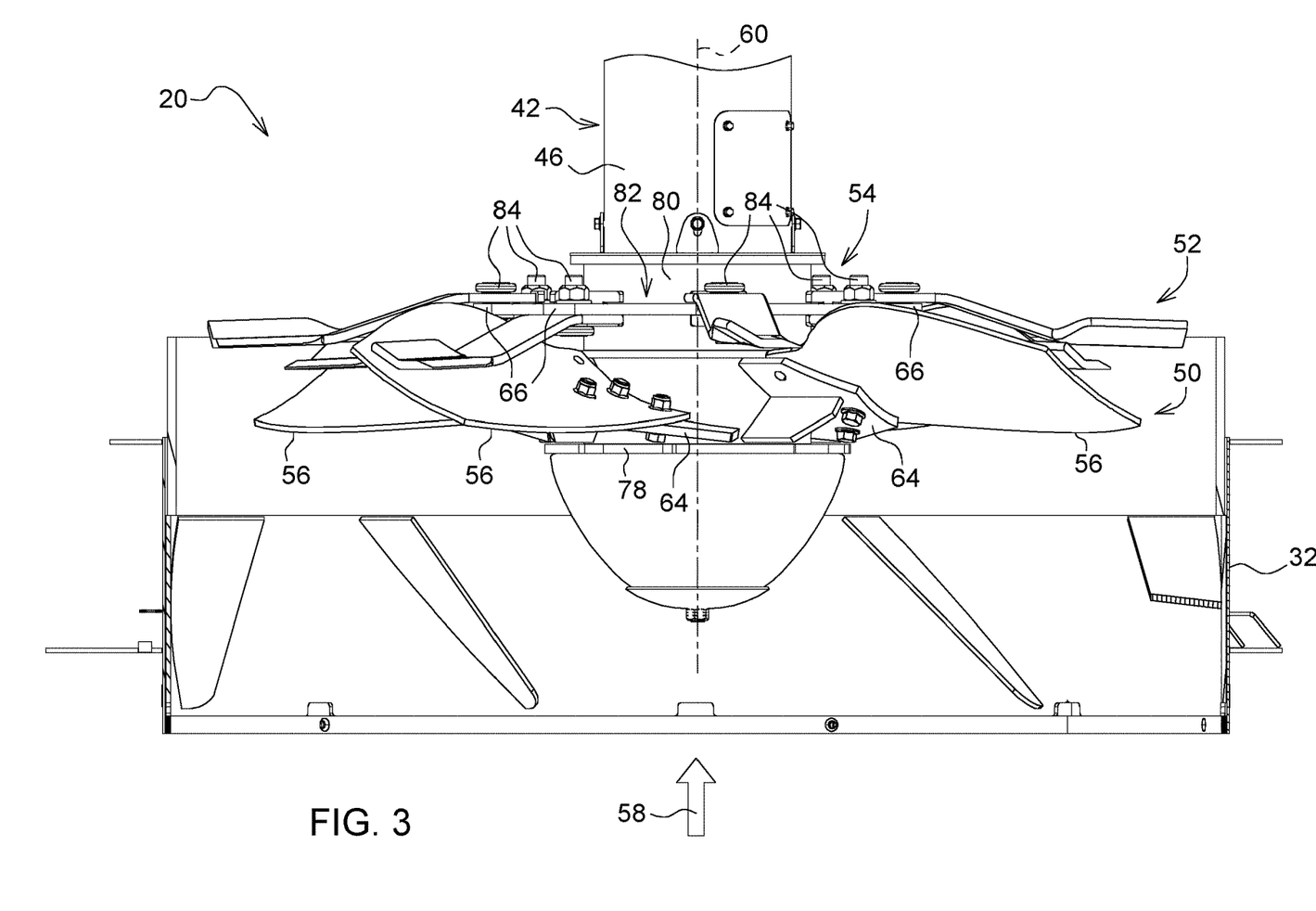
FIG. 3 is a side elevational view, with portions broken away, showing the fan and the leaf shredder.
Figure 4:
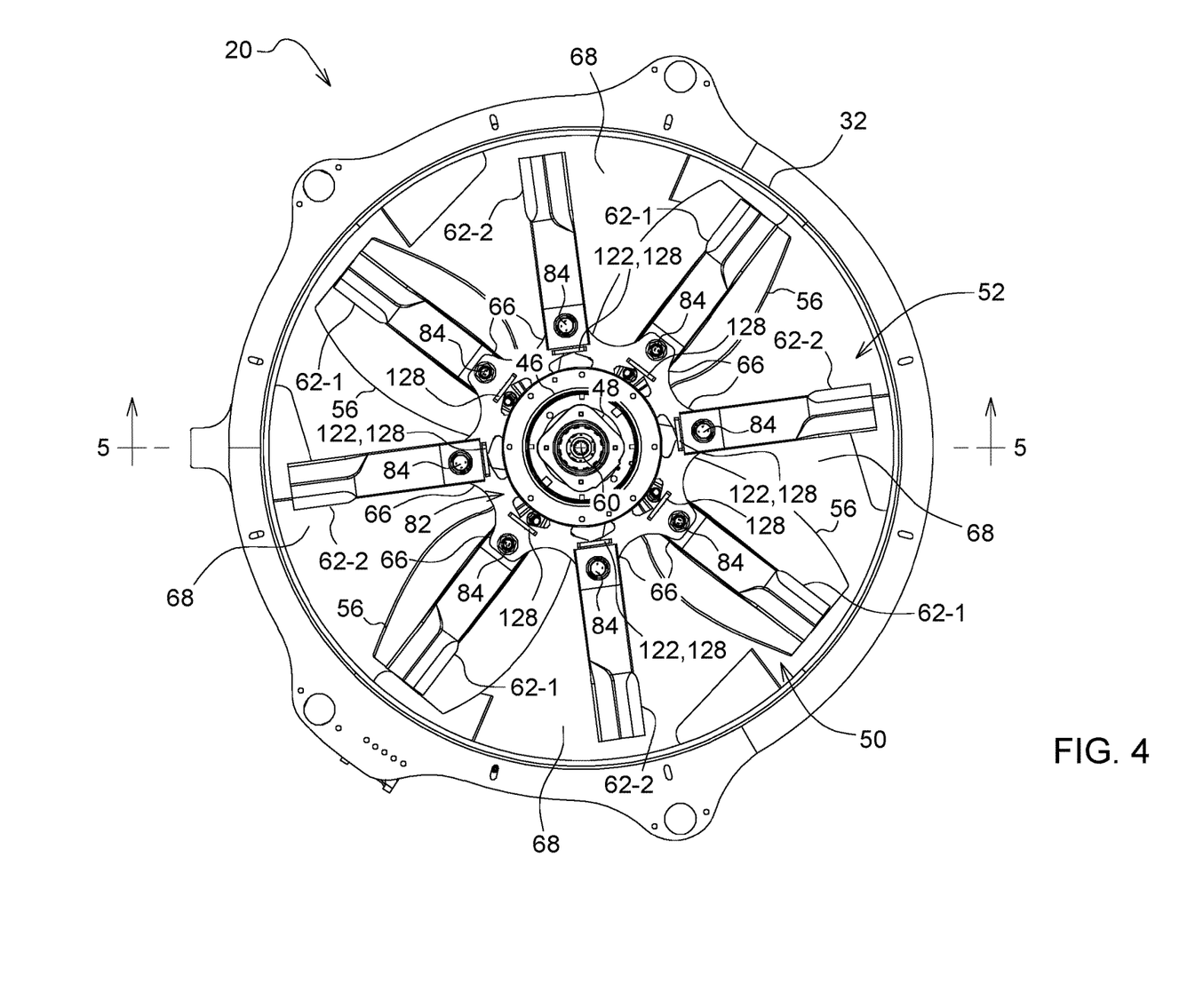
FIG. 4 is a top plan view showing the fan and the leaf shredder.

Referring to FIG. 1, a sugarcane harvester 10 is configured to harvest sugarcane. The harvester 10 includes, for example, a topper 12, one or more basecutters 14 (only one basecutter shown), a feed section 16, a chopper 18, a primary extractor 20, an elevator 22, and a secondary extractor 24. The topper 12 cuts some of the leaves off the sugarcane plants before the plants are severed by the one or more basecutters 14, but may not remove all the leaves from the plants before ingestion into the harvester 10. Each of the one or more basecutters 14 includes a left cutting disk and a right cutting disk (only a left cutting disk shown). The left and right cutting disks of each of the one or more basecutters 14 cooperate with one another to sever the stalks of sugarcane plants at a location near the ground. The feed section 16 receives a mat of severed sugarcane from each of the one or more basecutters 14 and feeds the one or more mats rearwardly. The chopper 18 receives the one or more mats from the feed section 16 and cuts the sugarcane stalks into billets. The primary extractor 20 is positioned between the chopper 18 and the elevator 22 to separate leaves ingested into the harvester 10 from the billets discharged from the chopper 18 and removes the leaves from the harvester 10. The elevator 22 is positioned at the rear of the harvester 10 to receive the billets and leaves that may not have been removed by the primary extractor 20 and conveys the billets and remaining leaves to an elevated position where the billets are discharged from the harvester 10 into a wagon to be hauled away. The secondary extractor 24 is mounted to the upper discharge end of the elevator 22 to further separate leaves from the billets.

The harvester 10 includes an operator's station 26 and traction elements 28. A human operator can operate the harvester 10 from the operator's station 26. The traction elements 28 are positioned on the left and right sides of the harvester 10 for engaging the ground 30 and propelling the harvester 10. Each traction element 28 may be, for example, a ground-engaging wheel or a track unit.

Referring to FIGS. 2-6, the primary extractor 20 includes an extractor frame 32 and a hood 34 mounted to the extractor frame 32. The extractor frame 32 is mounted to a frame 36 of the harvester 10 for rotation by an extractor rotator. The extractor rotator can rotate the primary extractor 20 to redirect discharge of leaves from a discharge outlet 40 of the hood 34.

The extractor 20 includes a support 42 coupled to a spider 44 of the extractor frame 32. The support 42 includes a tubular column or can 46 depending from the spider 44 and a motor 48 positioned within and fixedly coupled (e.g., bolted) to the can 46.

The extractor 20 includes a fan 50, a leaf shredder 52, and a hub 54 to which the fan 50 and the leaf shredder 52 are coupled. The fan 50 includes fan blades 56 to induce a flow of air 58 to separate leaves from billets upon rotation of the fan 50 about an axis of rotation 60. The fan 50 includes fan blades 56 to induce the flow of air 58 upon rotation of the fan 50 about the axis of rotation 60. The leaf shredder 52 includes shredding blades 62 to cut leaves prior to their ejection from the extractor 20 upon rotation of the leaf shredder 52 about the axis of rotation 60. The hub 54 is rotatably driven about the axis of rotation 60. The fan blades 56 and the shredding blades 62 are coupled to the hub 54 for rotation together with the hub 54 about the axis of rotation 60. The motor 48 is drivingly coupled to the hub 54 to rotate the hub 54 and the fan and shredding blades 56, 62 coupled thereto about the axis of rotation 60. Coupling the leaf shredder 52 and its shredding blades 62 to the same hub 54 as the fan 50 and its fan blades 56 provides a relatively simple design for including the leaf shredder 52 in the extractor 20.

The hub 54 includes a first set of attachment points 64 and a second set of attachment points 66. The fan blades 56 are coupled respectively to the attachment points 64 of the first set. The shredding blades 62 are coupled respectively to the attachment points 66 of the second set. The second set of attachment points 66 are positioned axially downstream from the first set of attachment points 64 relative to the axis of rotation 60. As such, the leaf shredder 52 and its shredding blades 62 are positioned axially downstream from the fan 50 and its fan blades 56 relative to the axis of rotation 60.

The shredding blades 62 comprises a first set of shredding blades 62-1 and a second set of shredding blades 62-2. The shredding blades 62-1 are positioned respectively directly above the fan blades 56. In a top plan view (FIG. 4), the shredding blades 62-2 are positioned respectively in angular gaps 68 defined between the fan blades 56 relative to the axis of rotation 60. Each shredding blade 62-2 is positioned in an angular gap 68 defined between adjacent fan blades 56.

Figure 5:
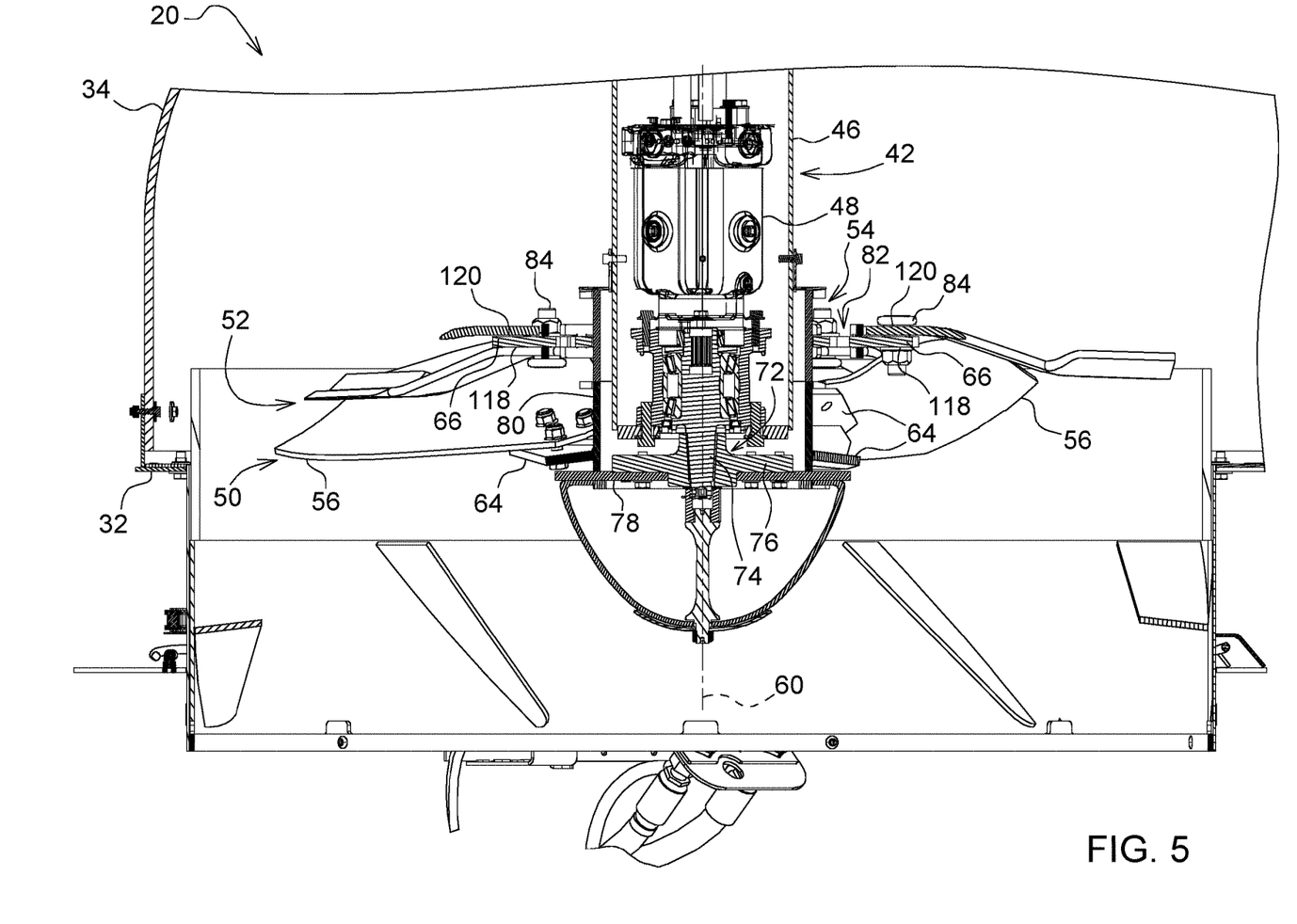
FIG. 5 is a sectional view taken along lines 5-5 of FIG. 4.

The motor 48 includes an output 72. The output 72 includes an output shaft 74 and an output flange 76 fixedly coupled to the output shaft 74. There is an interference fit between the output flange 76 and the output shaft 74, and the output flange 76 is keyed to the output shaft 74 against rotation relative thereto. A nut (e.g., a type of castle nut or similar thereto) is attached to the end of the output shaft 74 to retain the output flange 76 axially on the output shaft 74.

Figure 6:
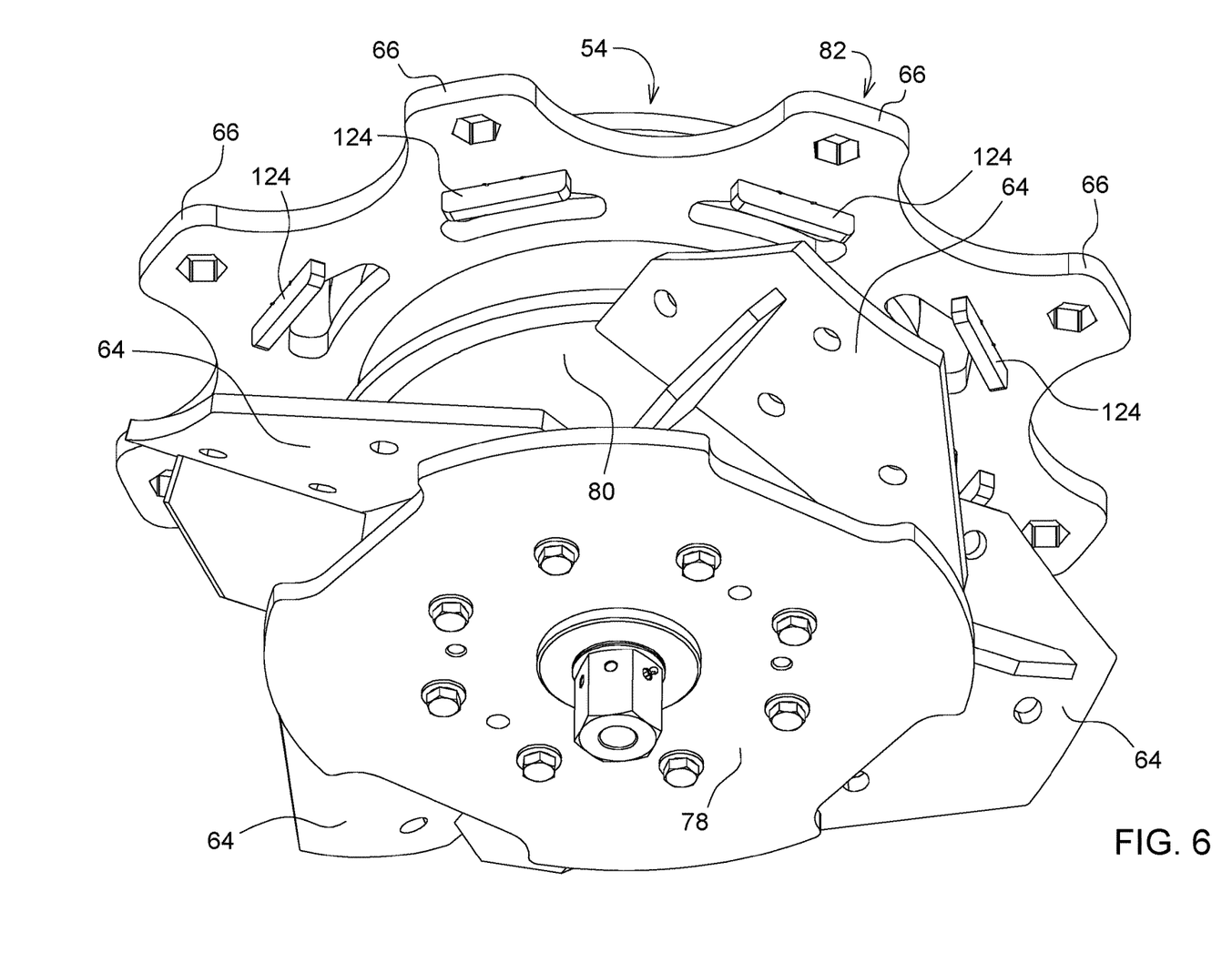
FIG. 6 is a perspective view showing a hub.

The hub 54 may be configured in a wide variety of ways. For example, the hub 54 includes an end wall 78 and a cylinder 80. The end wall 78 is fixedly coupled to the output flange 76 (e.g., bolted). The cylinder 80 is fixedly coupled to the end wall 78 (e.g., welded).

The first set of attachment points 64 is coupled to the cylinder 80. Each of the attachment points 64 includes a mounting plate fixedly coupled to the cylinder 80 (e.g., welded) and a support plate fixedly coupled to the cylinder 80 (e.g., welded) and to an underside of the mounting plate (e.g., welded) to support the mounting plate. Each fan blade 56 is fixedly coupled to a mounting plate of a respective attachment point 64 (e.g., bolted).

The hub 54 includes a ring 82. The ring 82 is coupled to and surrounds the cylinder 80 so as to extend radially outwardly from the cylinder 80 relative to the axis 60. The ring 82 is fixedly coupled to the cylinder 80 (e.g., welded).

The ring 82 includes the second set of attachment points 66. Each attachment point 66 is configured, for example, as a tab projecting radially outwardly relative to the axis 60.

Referring to FIGS. 3, 4, and 7-9, the shredding blades 62 are coupled to the hub 54 for flailing movement. Each shredding blade 62 is flailingly coupled to a respective attachment point 66 of the ring 82 by use of a flail coupler 84. The flail coupler 84 includes a bolt 86, a washer 88, and a nut 90. The bolt 86 extends through a circular aperture 92 included in the shredding blade 62, a hexagonal aperture 94 included in the attachment point 66, and a hexagonal aperture 96 included the washer 88, with the nut 90 threaded onto a threaded portion 98 of the bolt 86. The bolt 86 includes a circular non-threaded portion 110 and a hexagonal portion 112. The circular non-threaded portion 110 is positioned between a head 114 of the bolt 86 and the hexagonal portion 112. The hexagonal portion 112 is positioned between the circular non-threaded portion 110 and the threaded portion 98, and extends through and is positioned in the hexagonal apertures 94, 96 of the attachment point 66 and the washer 88. A shoulder 115 is positioned between the circular non-threaded portion 110 and the hexagonal portion 112 and contacts a surface of the attachment point 66 upon tightening of the nut 90. The shredding blade 62 may thus be coupled to the attachment point 66 for flailing movement about an axis 116 defined by the bolt 86.

The shredding blades 62 are alternatingly axially staggered relative to the axis of rotation 60, to promote cutting of leaves. The attachment points 66 of the second set of attachment points 66 are axially even with one another relative to the axis of rotation 60 such that they are at the same axial level. The shredding blades 62 are alternatingly coupled to lower and upper sides 118, 120 of the attachment points 66. For example, each of the shredding blades 62-1 is coupled to the lower side 118 of the respective attachment point 66, and each of the shredding blades 62-2 is coupled to the upper side 120 of the respective attachment point 66.

Figure 7:
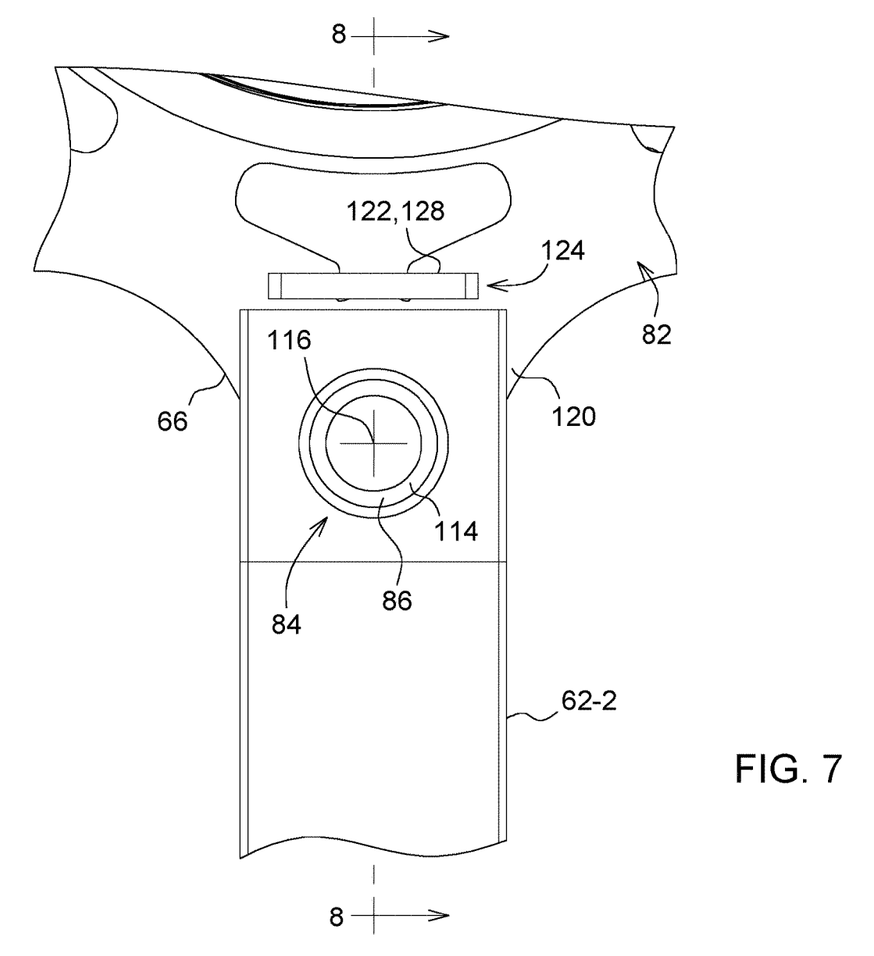
FIG. 7 is a top plan view showing mounting of a shredding blade of the leaf shredder.
Figure 8:
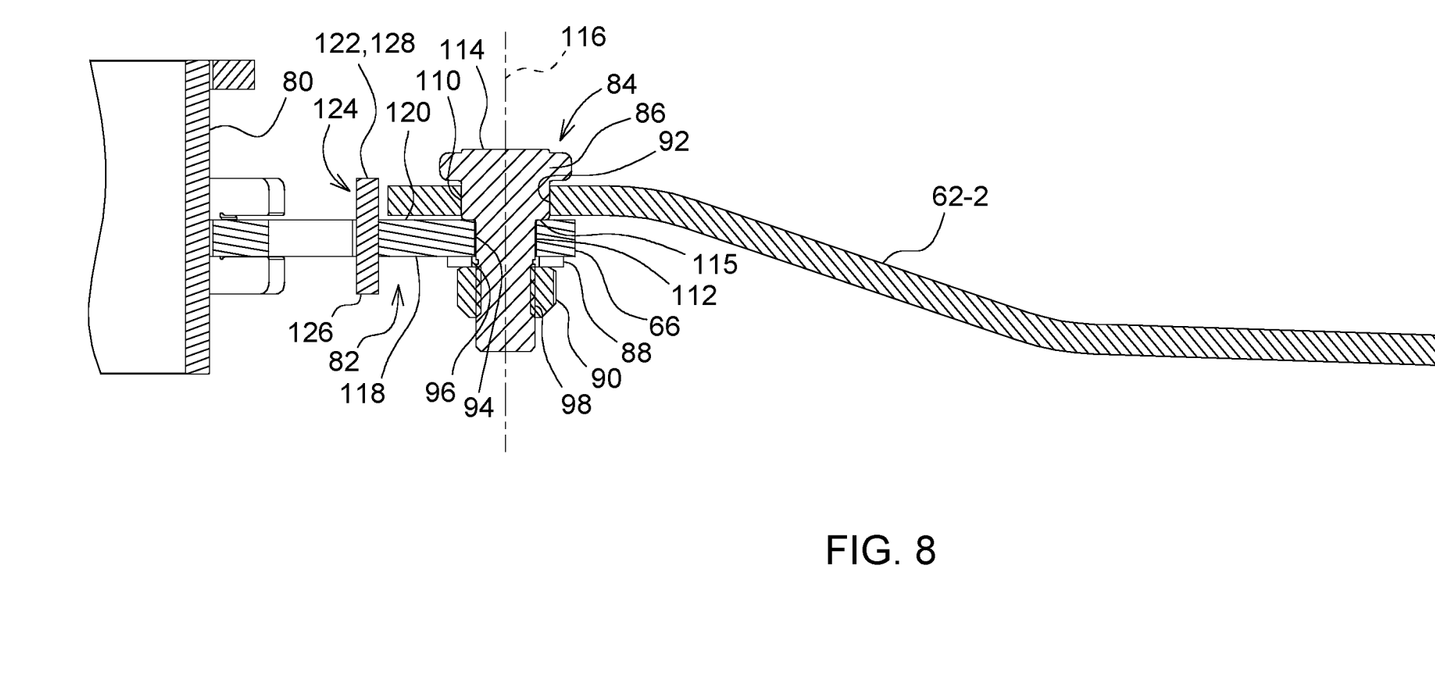
FIG. 8 is a sectional view taken along lines 8-8 of FIG. 7 showing a flail coupler for coupling the shredding blade to an attachment point.
Figure 9:
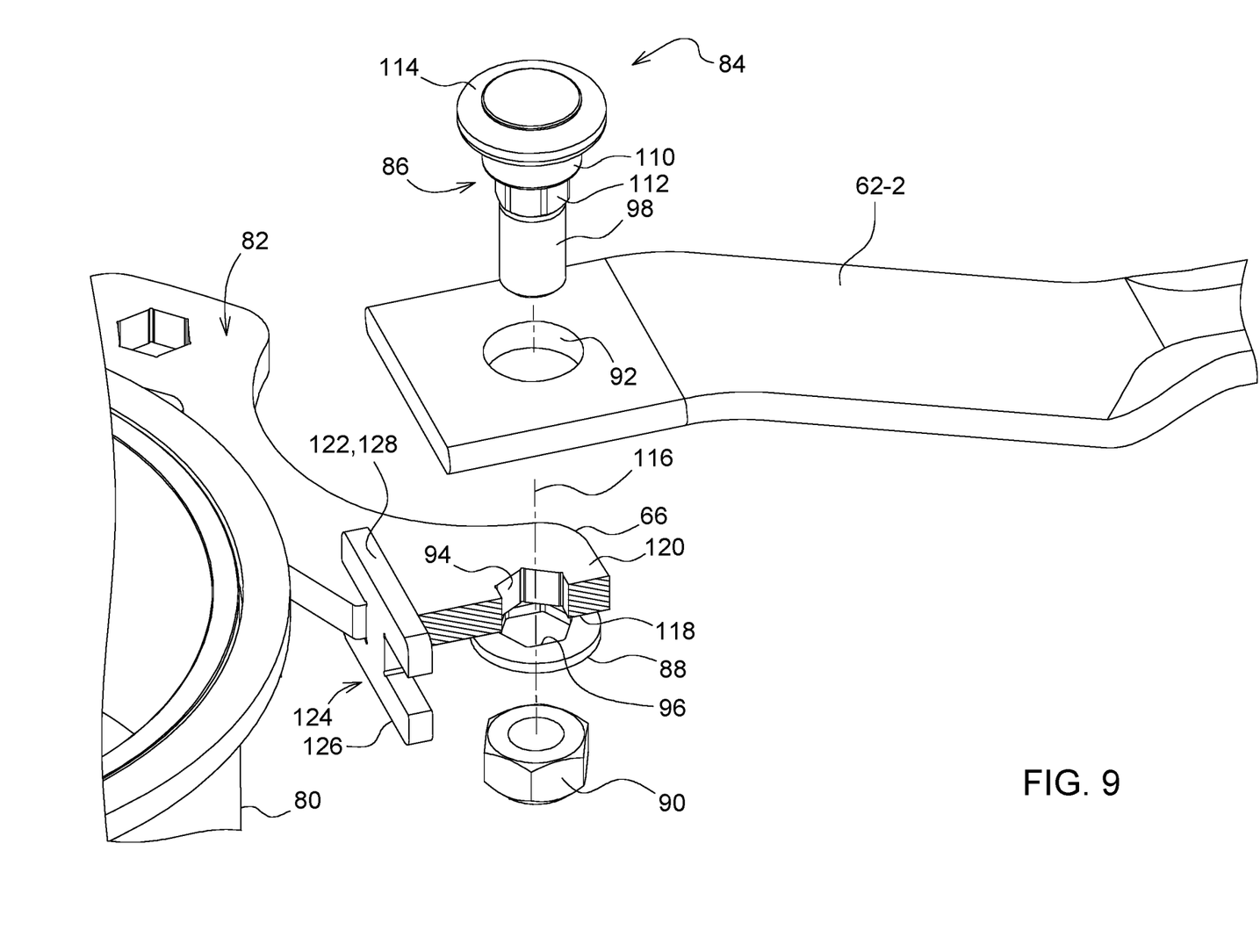
FIG. 9 is an exploded perspective view showing the flail coupler.

The extractor 20 includes stops 122 for the shredding blades 62. The stops 122 are coupled to the hub 54 and respectively associated with the shredding blades 62 to limit flailing movement of the shredding blades 62 about the axes 116. Illustratively, each stop 122 is fixedly coupled to the ring 82 (e.g., welded) to limit flailing movement of the respective shredding blade 62 about the axis 116 defined by the bolt 86 to which the shredding blade 62 is flailingly coupled. A radially inner end of the shredding blade 62, relative to the axis 60, is arranged to contact the stop 122 at opposite ends of the range of travel of the shredding blade 62.

The stop 122 is included, for example, in an I-shaped element 124 (i.e., having a shape similar to a capital letter I). The element 124 is fixedly coupled to the ring 82 (e.g., welded), and includes a lower cross-member 126, an upper cross-member 128, and a spine 134 interconnecting and perpendicular to the lower and upper cross-members 126, 128. During assembly, a cross-member 126 or 128 of the element 124 is inserted into a first portion of an aperture 136 included in the ring 82, the element 124 is re-positioned to nest the spine 134 in a narrower second portion of the aperture 136, and the element 124 is then fixed in place. In this way, either cross member 126, 128 can be the stop 122 for the shredding blade 62 depending on whether the shredding blade 62 is coupled to the lower side 118 of the attachment point 66 or the upper side 120 of the attachment point 66.

Each fan blade 56 and each shredding blade 62 can be configured in any suitable manner. Each shredding blade 62 has a cutting edge, which can be of any suitable length.

Threads are not shown for ease of illustration. However, it is to be appreciated that bolts and corresponding nuts would have threads.

While the above describes example embodiments of the present disclosure, these descriptions should not be viewed in a limiting sense. Rather, other variations and modifications can be made without departing from the scope and spirit of the present disclosure as defined in the appended claims.

What is claimed is:

1. An extractor for a sugarcane harvester that chops stalks of sugarcane into billets, the extractor comprising:
a fan comprising fan blades to induce a flow of air to separate leaves from billets,
a leaf shredder comprising shredding blades to cut leaves prior to their ejection from the extractor,
a hub rotatably driven about an axis of rotation, the fan blades and the shredding blades coupled to the hub for rotation together with the hub about the axis of rotation;
wherein the hub comprises a first set of attachment points to which the fan blades are coupled and a second set of attachment points to which the shredding blades are coupled; and wherein the second set of attachment points of the hub are positioned axially downstream from the first set of attachment points of the hub relative to the axis of rotation.

2. The extractor of claim 1, comprising a motor drivingly coupled to the hub to rotate the hub, the fan blades and the shredding blades coupled thereto about the axis of rotation.

3. The extractor of claim 1, wherein the hub comprises a cylinder and a ring coupled to and surrounding the cylinder, the first set of attachment points are coupled to the cylinder, and the second set of attachment points are included in the ring.

4. An extractor for a sugarcane harvester that chops stalks of sugarcane into billets, the extractor comprising:
   a fan comprising fan blades to induce a flow of air to separate leaves from billets,
   a leaf shredder comprising shredding blades to cut leaves prior to their ejection from the extractor,
   a hub rotatably driven about an axis of rotation, the fan blades and the shredding blades coupled to the hub for rotation together with the hub about the axis of rotation; and
   wherein the shredding blades are coupled to the hub for flailing movement.

5. The extractor of claim 4, comprising stops coupled to the hub and respectively associated with the shredding blades to limit flailing movement of the shredding blades.

6. The extractor of claim 1, wherein at least one of the shredding blades is axially staggered from at least one of the other shredding blades relative to the axis of rotation.

7. The extractor of claim 6, wherein the hub comprises a first attachment point and a second attachment point, the first and second attachment points are axially even with one another relative to the axis of rotation, each of the first attachment point and the second attachment point comprises a lower side and an upper side, the at least one of the shredding blades is coupled to the lower side of the first attachment point, and the at least one of the other shredding blades is coupled to the upper side of the second attachment point.

8. The extractor of claim 1, wherein the shredding blades are alternatingly axially staggered relative to the axis of rotation.

9. The extractor of claim 1, wherein the shredding blades are positioned respectively directly above the fan blades.

10. The extractor of claim 1, wherein in a top plan view the shredding blades are positioned respectively in angular gaps defined between the fan blades relative to the axis of rotation.

11. The extractor of claim 1, wherein the shredding blades comprises a first set of shredding blades and a second set of shredding blades, the shredding blades of the first set of shredding blades are positioned respectively directly above the fan blades, and in a top plan view the shredding blades of the second set of shredding blades are positioned respectively in angular gaps defined between the fan blades relative to the axis of rotation.

12. An extractor for a sugarcane harvester that chops stalks of sugarcane into billets, the extractor comprising:
   a hub rotatable about an axis of rotation;
   a plurality of fan blades attached to the hub and rotatable with the hub to induce a flow of air to separate leaves from billets;
   a plurality of shredding blades attached to the hub and rotatable with the hub to cut leaves;
   wherein both the plurality of fan blades and the plurality of shredding blades are both rotated about the axis of rotation by the hub;
   wherein the hub includes a first set of attachment points to which the plurality of fan blades are coupled and a second set of attachment points to which the plurality of shredding blades are coupled;
   wherein the second set of attachment points of the hub are positioned axially downstream from the first set of attachment points of the hub relative to the axis of rotation; and
   wherein the shredding blades are alternatingly axially staggered relative to the axis of rotation.

13. The extractor of claim 12, further comprising a motor drivingly coupled to the hub to rotate the hub about the axis of rotation, whereby both the plurality of fan blades, and the plurality of shredding blades coupled to the hub are rotated with the hub about the axis of rotation.

* * * * *